United States Patent
Lawless et al.

(10) Patent No.: US 10,366,360 B2
(45) Date of Patent: Jul. 30, 2019

(54) SYSTEM AND METHOD FOR IDENTIFYING POTENTIAL FUTURE INTERACTION RISKS BETWEEN A CLIENT AND A PROVIDER

(71) Applicant: SPF, Inc., Winnetka, IL (US)

(72) Inventors: Jennifer S. Lawless, Winnetka, IL (US); Charles B. Lawless, Winnetka, IL (US); Michael William Hader, Palatine, IL (US)

(73) Assignee: SPF, INC., Winnetka, IL (US)

( * ) Notice: Subject to any disclaimer, the term of this patent is extended or adjusted under 35 U.S.C. 154(b) by 215 days.

(21) Appl. No.: 14/527,467

(22) Filed: Oct. 29, 2014

(65) Prior Publication Data
US 2015/0051945 A1 Feb. 19, 2015

Related U.S. Application Data

(63) Continuation-in-part of application No. 13/679,236, filed on Nov. 16, 2012.

(51) Int. Cl.
*G06Q 10/06* (2012.01)

(52) U.S. Cl.
CPC .................. *G06Q 10/0635* (2013.01)

(58) Field of Classification Search
None
See application file for complete search history.

(56) References Cited

U.S. PATENT DOCUMENTS

| | | | |
|---|---|---|---|
| 6,128,620 A * | 10/2000 | Pissanos | G06F 19/325 705/2 |
| 6,556,992 B1 | 4/2003 | Barney et al. | |
| 6,604,080 B1 | 8/2003 | Kern | |
| 6,901,404 B1 * | 5/2005 | Bonutti | G06F 17/30864 |
| 6,990,591 B1 | 1/2006 | Pearson | |
| 7,237,267 B2 | 6/2007 | Rayes et al. | |
| 7,373,669 B2 | 5/2008 | Eisen | |
| 7,419,094 B2 | 9/2008 | Grear et al. | |
| 7,522,060 B1 | 4/2009 | Tumperi et al. | |
| 7,599,883 B2 | 10/2009 | Hollis et al. | |
| 7,653,188 B2 | 1/2010 | Kloberdans et al. | |
| 7,653,590 B1 | 1/2010 | Kroon et al. | |
| 7,707,130 B2 | 4/2010 | Kelly et al. | |

(Continued)

OTHER PUBLICATIONS

Lewin, Tamar, New Weapon to Deter Malpractice Suites—Computer service helps doctors screen out litigious patients San Francisco Chronical, Aug. 28, 1993.*

(Continued)

*Primary Examiner* — Eric W Stamber
*Assistant Examiner* — Ashley Y Young
(74) *Attorney, Agent, or Firm* — Dunlap Codding, P.C.

(57) ABSTRACT

A method for identifying potential future interaction risks between a client and a provider using a computer server is disclosed. Transactions between the client and the provider are conducted in association with one or more communication platforms and the method includes storing client data on the computer server received from a variety of data sources including client claims data, and storing agent data on the computer server received from a variety of data sources. The method further includes obtaining feedback data related to at least one of the client, the agent, and one of the transactions and analyzing the data to identify potential future transactional problems.

20 Claims, 11 Drawing Sheets

(56) References Cited

U.S. PATENT DOCUMENTS

| | | | |
|---|---|---|---|
| 7,716,226 | B2 | 5/2010 | Barney |
| 7,752,274 | B2 | 7/2010 | Pagan |
| 7,814,008 | B2 | 10/2010 | Choudhuri et al. |
| 8,131,808 | B2 | 3/2012 | Aoki et al. |
| 8,161,060 | B2 | 4/2012 | Frayman et al. |
| 8,683,052 | B1 | 3/2014 | Brinskelle |
| 8,924,237 | B2 * | 12/2014 | Herz ............ G06Q 10/0635 705/2 |
| 2002/0022956 | A1 | 2/2002 | Ukrainczyk et al. |
| 2002/0143562 | A1 * | 10/2002 | Lawrence ......... G06Q 10/10 705/311 |
| 2007/0217693 | A1 | 9/2007 | Kretzschmar, Jr. |
| 2007/0233787 | A1 | 10/2007 | Pagan |
| 2009/0198630 | A1 * | 8/2009 | Treitler ............ G06Q 40/06 705/36 R |
| 2010/0174570 | A1 | 7/2010 | Cheng et al. |

OTHER PUBLICATIONS

Silverman, Rachel Emma, Litigious Patient Database Shuts The Wall Street Journal, Mar. 11, 2004.*

Weycker, Derek et al., Medical Malpractice among physicians: Who will be sued and who will pay Health Care Management Science, vol. 3, 2000.*

Dimmock, Stephen et al., Predicting fraud by investment managers Journal of Financial Ecomomics, vol. 105, 2012.*

Charles, Sara C. et al., Predicting Risk for Medical Malpractice Claims Using Quality of Care Characteristics The Western Journal of Medicine, Oct. 1992.*

Gibbons, Robert D. et al., A Random Effects Probit Model for Predicting Medical Malpractice Claims Journal of American Statistical Association, vol. 89, No. 427, Sep. 1994.*

IntelliReach Launches Content Inspector for GroupWQise, Business Wire, Jan. 4, 2005.

Kenealy, Bill, More claims professionals are using predictive modeling, Business Insurance, Oct. 21, 2012.

Lindgren, Orely H. et al., Medical Malpractice Risk Management Early Warning Systems, Law and Contemporary Problems, vol. 54, No. 2, Spring 1991.

Weycker, Derek A. et al., Medical malpractice among physicians: Who will be sued and who will pay?, Health Care Management Science, vol. 3, 2000.

Hickson, Gerald B. et al.,. Identifying and Addresssing Communication Failures as a Means of Reducing Unnecessary Malpractice Claims, NC Med Journal, Sep./Oct., vol. 68, No. 5, 2007.

Huntington, Beth et al., Communication gaffes: a root cause or malpractice claims, BUMC Proceedings, vol. 16, 2003.

Jensend, Gail A. et al., Physicians and the risk of medical malpractice: The role of prior litigation in predicting the future, The Quarterly Review of Economics and Finance, vol. 39, 1999.

* cited by examiner

```
                    Name [_____]
                         □ Check box if you have ever gone by another name
                     SSN [_____]
            Date of Birth [_____]
                 Address [_____]
                         □ Check box if been at address for at least three years
        Telephone Number [_____]
           Email Address [_____]
     Prior Three Addresses [_____]
    Previous Investment Firm [_____]

[ UNIQUE CLIENT ID WAS ASSIGNED ]
```

FIG. 4A

```
                    Name [_____]
                         □ Check box if you have ever gone by another name
                     SSN [_____]
                 Address [_____]
                         □ Check box if been at address for at least three years
        Telephone Number [_____]
           Email Address [_____]
     Prior Three Addresses [_____]
                         [_____]
                         [_____]
     Health Ins. Provider [_____]
            Group Number [_____]
               ID Number [_____]
    Primary Care Provider [_____]
                         [ UNIQUE CLIENT ID WAS ASSIGNED ]
```

SYSTEM AND METHOD FOR IDENTIFYING POTENTIAL FUTURE INTERACTION RISKS BETWEEN A CLIENT AND A PROVIDER

This application claims priority from and is a continuation-in-part of U.S. application Ser. No. 13/679,236 filed on Nov. 16, 2012, entitled "System and Method for Assessing Interaction Risks Potentially Associated With Transactions Between a Client and a Provider."

BACKGROUND OF THE INVENTION FIELD OF THE INVENTION

The invention relates to a system and method for assessing interaction risks as well as a system and method for minimizing those risks. Among other fields and applications, the invention has utility in the assessment of risk of litigation and the filing of claims against medical providers, broker-dealers, and legal and financial service providers.

DESCRIPTION OF THE RELATED ART

Many economic pundits will assert that the service sector in the United States has steadily risen over the past quarter century to the point where today's domestic economy is driven primarily by services rather than the manufacture of products. As the service sector has expanded over the years, so have the number of professional service providers and agents and the number of consumers that hire these providers and agents to perform highly-skilled services in the financial, legal, medical, and accounting fields, etc.

While the service sector has exploded, so has technology and the manner in which businesses communicate. Although unheard of 15 years ago, it is commonplace now for businesses to communicate not only over the telephone and facsimile, but using e-mail and SMS communications, or a combination of the above. Unfortunately, in today's fast-pace world, with communications coming from multiple sources, it is not uncommon for an underlying message to be "lost in translation," muddled, confused, unintelligible or otherwise inconsistent.

As a result of these technological realities, service providers are often stuck in the thick of it. While focused on the client's bottom line or goals, many service providers forget to protect themselves and their firms from muddled communications and client instructions.

As a result of the foregoing, a need exists that automatically protects the interests of the service providers and their firms/companies from clients that later refute the existence or scope of communications/messages/instructions out of malice or a legitimate misunderstanding. In particular, a need exists to protect service providers from being "burned" by clients in a distracting battle of "he said, she said." Such a need would preferably operate behind the scenes so as to not interrupt a service provider's efficiency, output and/or work product.

SUMMARY OF THE INVENTION

The present disclosure teaches various inventions that address, in part (or in whole) these and other various desires in the art. Those of ordinary skill in the art to which the inventions pertain, having the present disclosure before them, will also come to realize that the inventions disclosed herein may address needs not explicitly identified in the present application. Those skilled in the art may also recognize that the principles disclosed may be applied to a wide variety of techniques involving communications, gaming, marketing, reward systems, and social networking.

The invention relates to a method for identifying potential future interaction risks between a client and a provider using a computer server wherein transactions between the client and the provider are conducted in association with one or more communication platforms. The method includes storing client data on the computer server received from a variety of data sources including at least one source of client claims data and storing agent data on the computer server received from a variety of data sources. The method further includes obtaining feedback data related to at least one of the client, the agent, and one of the transactions. The method also includes analyzing the data to identify potential future transactional problems.

These and other advantages and uses of the present system and associated methods will become clear to those of ordinary skill in the art after reviewing the present specification, drawings, and claims.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 4A and 4B of the drawings illustrate graphical user interfaces that may be used in association with certain aspects of the method for assessing interaction risks potentially associated with transactions between a client and a provider.

Persons of ordinary skill in the art will appreciate that elements in the figures are obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Figure 1:
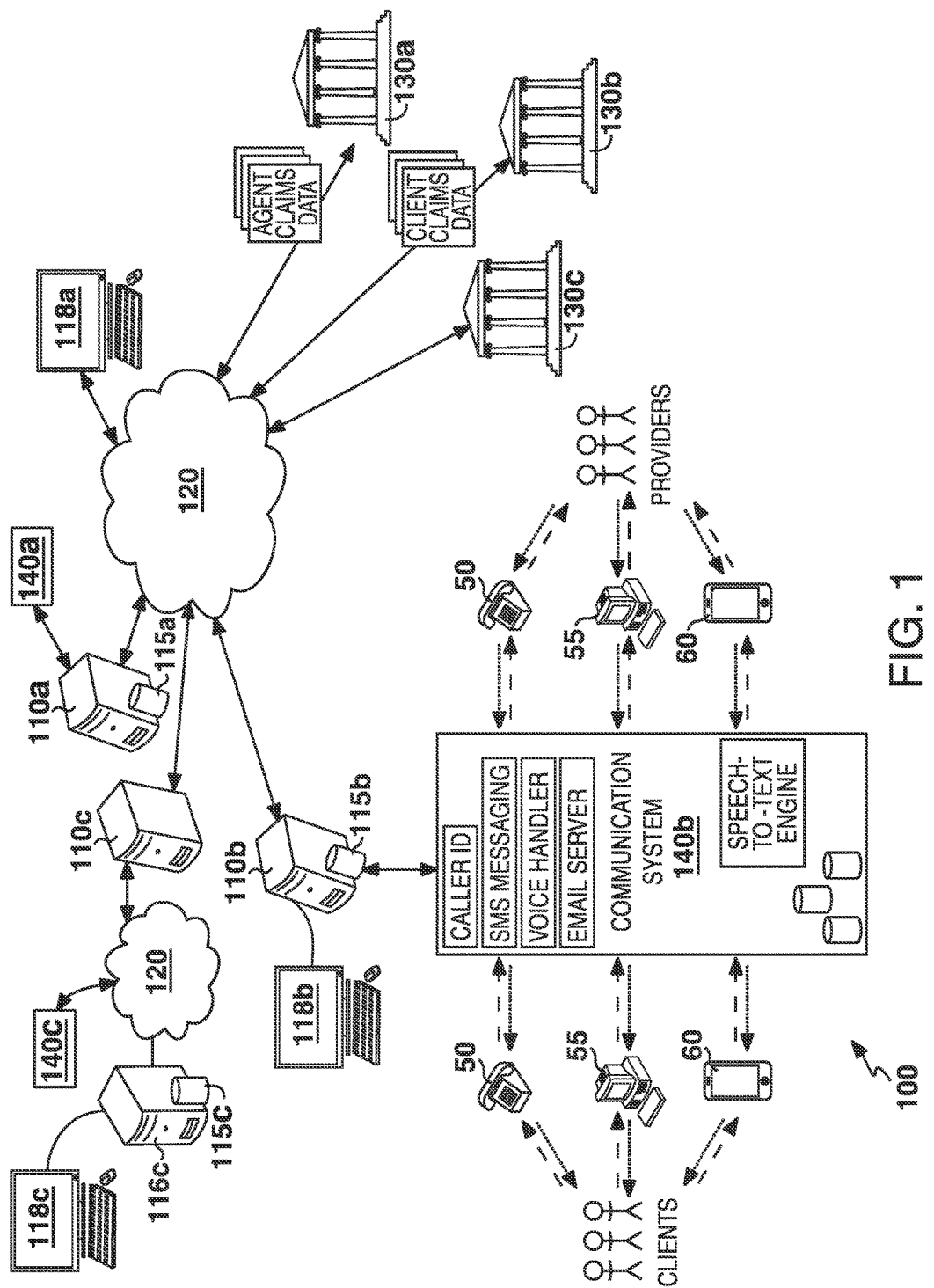
FIG. 1 of the drawing is a block diagram illustrating three potential configurations of one approach to a system for assessing interaction risks potentially associated with transactions between a client and a provider.

FIG. 1 of the drawing is a block diagram illustrating three potential configurations—A, B, and C—of one approach to system 100 for assessing interaction risks potentially associated with transactions between a client and a provider. In one potential application of system 100, the provider may be an individual broker dealing in securities for one or more investor-clients. The provider may also be an institution having a plurality of institutional agents each of the institutional agents dealing in securities for one or more investor-clients. The institution has supervisors with a duty to ensure that the institution's investor-clients are being dealt with fairly.

In another potential application of the system 100, the provider may be a doctor or 10 other health care worker providing care to a client-patient. The provider in this instance may be a hospital or medical practice. In yet other potential applications of the system 100 the provider may be lawyer or law firm; certified public accountant or accounting firm; or any other professional servant (or their firm) that interacts with clients and may the risk of incomplete or misunderstood communications or even miscommunication.

Communications between brokers/institutional agents and their investors, lawyers and their clients, CPA's and their clients are frequently conducted over electronic means of communications including voice calls (via telephones 50 or smartphones 60); emails (via computers 55); text messages and instant messages (via smartphones 60); facsimiles; video phone calls; and other forms of communications that may take place over electronic facilities. Generally, these electronic communications are passed through a communications system or platform 140 that handles such communications. As would be understood by those of ordinary skill in the art having the present specification, drawings and claims before them, communication system 140 may be comprised of one or more communication handling systems. For instance, the various communication handling systems that comprise communications system 140 may include voice handler (e.g. analog or VOIP PABX with caller identification and voice mail services), email server (e.g. IMAP, MAPI, POP3, SMTP, or web-based protocol), and SMS messaging server, fax server, and instant messaging server. Each of the communication handling systems found in communications systems 140 may be sourced from different technology suppliers including, for instance Avaya, Cisco Systems, Microsoft, and Siemens, among other potential technology suppliers. As would be understood by those of ordinary skill in the art having the present specification, drawings and claims before them each of the communication 10 handling systems in communications system 140 may be also created from scratch—e.g., the communications system 140 may be a non-commercial, proprietary system—rather than being sourced from a supplier. The various communication handling systems in communications system 140 may be co-located or spread across more than one physical location.

FIG. 1 shows that Providers "A," "B," and "C" may be operably associated with communication systems 140a, 140b, and 140c, respectively. Similarly, Providers "A," "B," and "C" may also be operably associated with servers 110a, 110b, 110c, and 116c; databases 115a, 115b, and 115c; and workstations 118a, 118b, and 118c, respectively. As illustrated in FIG. 1, various components of system 100 associated with a particular provider may be more closely associated with the other components, via direct connection or on a local area network. As further illustrated by FIG. 1, various components of system 100 associated with a particular provider may be located in the cloud operably connected to the other components via the network 120. In particular, workstation 118a is operably connected to server 110a via the network 120. In another example, communication system 140c is operably connected to Server 110c via the network 120. In the same example, server 110c is operably connected to another server 116 and database 115c via the network 120. Network 120 may be the Internet, WAN, LAN, Wi-Fi, other computer network (now known or invented in the future) as well as any combination of the foregoing. It should be understood by those of ordinary skill in the art having the present specification, drawings, and claims before them that the network 120 may connect the various elements of each provider's system over any combination of wired and wireless conduits, including copper, fiber optic, microwaves, and other forms of radio frequency, electrical and/or optical communication techniques. It should also be understood that each provider's network may be connected to the network 120 differently.

As shown in FIG. 1, data sources 130a, 130b, and 130c are also operably connected to the network 120, are in operable communication with one or more servers of the Providers on system 100. Data sources may be data bases, servers, or any other sources of information or data. Servers 110a, 110b, 110c, and 116c may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The general-purpose computer may be controlled by the WINDOWS XP operating system, WINDOWS VISTA, UNIX, LINUX, a JAVA based and/or iOS operating systems, to name a few. More preferably servers 110a, 110b, 110c, and 116c can be one of many commercially available web servers including, but not limited to Tomcat web servers, Apache web servers, Microsoft web servers, Google web servers, lighttpd web servers, and nginx web servers. The web servers may be running on any one of many operating systems including, but not limited to UNIX, LINUX, MAC OS, or Windows (XP, VISTA, etc.). It is contemplated, however, that any suitable web server may be used for the present invention. Servers 110a, 110b, 110c, and 116c may be a cluster of web servers, which may each be LINUX based and supported by a load balancer that decides which of the cluster of web server should process a request based upon the current request-load of the available server(s).

Database 115a, 115b, and 115c may be any suitable database or databases including, but not limited to, SQL databases (by Microsoft and others), Oracle databases, 4th Dimension databases, InterBase databases, and Apache databases. As illustrated, the databases 115a, 115b, and 115c may be operably connected the servers 110a, 110b, and 110c, respectively. As discussed later, the databases 115 store various information used within the system and method. While databases 115a, 115b, and 115c are each depicted as a single database, it should be understood by those of ordinary skill in the art having the present specification, drawings, and claims before them that the any and all of the databases 115a, 115b, and 115c may be stored in multiple locations and across multiple pieces of hardware, including but not limited to storage in the cloud (i.e. a set of virtual storage areas and systems that expand and contract with use without requiring the manual provisioning or deprovisioning of physical hardware by the administrator). In view of the sensitivity and/or commercial significance of most of the data stored in the databases they are preferably secured in an attempt to minimize the risk of undesired disclosure of viewer information to third parties. The databases may be standard relational database systems such as those available from Oracle, which are widely used to organize media files.

The workstations 118a, 118b, 118c may be general purpose computers that may have, among other elements, a microprocessor (such as from the Intel Corporation or AMD); volatile and non-volatile memory; one or more mass storage devices (Le., a hard drive); various user input devices, such as a mouse, a keyboard, or a microphone; and a video display system. In one aspect, the general-purpose computer may be controlled by the WINDOWS XP operating system. It is contemplated, however, that the present system would work equally well using a MACINTOSH computer or even another operating system such as a WINDOWS VISTA, UNIX, LINUX or a JAVA based operating system, to name a few.

The workstations 118a, 118b, and 118c may operably connect to servers 110a, 110b, 110c, and 116c respectively, via one of many available internet browsers including, but not limited to, Microsoft's Internet Explorer, Apple's Safari, and Mozilla's Firefox. Via the network 120, the end users may access the system 100 with an http-based website, although other graphical user interfaces can be used with the present system. The information entered by an end user via the workstation 118 can be encrypted before transmission over the network 120 for additional security. There are several commercially available encryption programs or algorithms available including, but not limited to, PC1 Encryption Algorithm, TrueCrypt, a Symantec encryption program, Blowfish, and Guardian Edge.

Figure 3A:
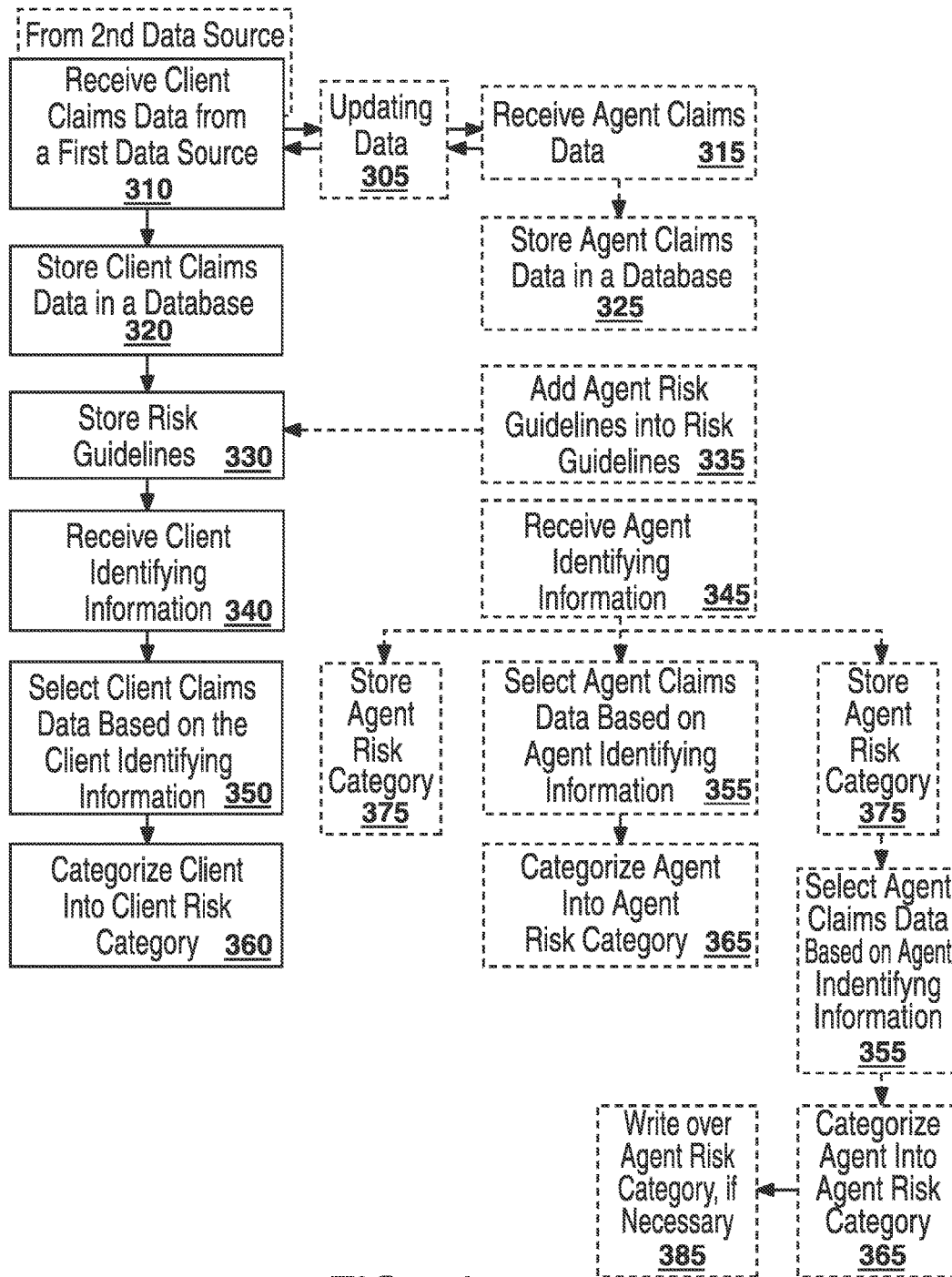
FIGS. 3A and 3B of the drawings are flow diagrams that together illustrate various aspects of the method for assessing interaction risks potentially associated with transactions between a client and a provider.
Figure 3B:
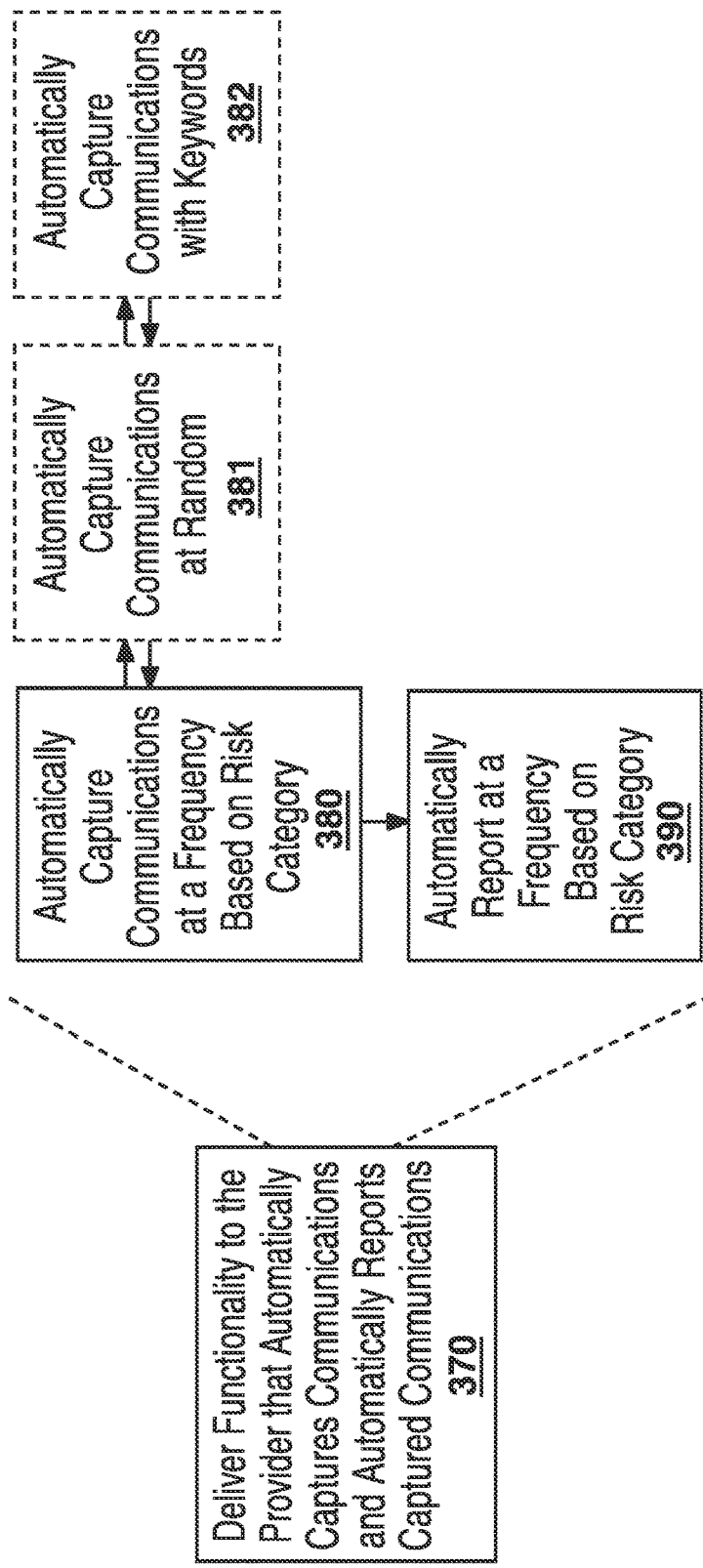

With reference to FIGS. 3A and 3B of the drawings, a method of assessing interaction risks potentially associated with transactions between a client and a provider, such as those illustrated in FIG. 1, may begin in block 310 with the receipt of client claims data from one or more data sources, such as data sources 130 of FIG. 1. As noted above, the term client is in reference to a party or person that interacts with or is likely to interact with a provider. As such client claims data may refer to information that is related to a particular client. For example, client claims data may include credit and/or financial information such as a credit score or history of bankruptcy, litigation history or propensity, educational background, medical history, family medical history, family or other demographic information, or any other information, data or metric related to a client.

Client claims data is received from one or more data sources, such as data sources 130a, 130b, and 130c. Data sources may include, but are not limited to, commercial and non-commercial proprietary data stores of information such as data stores maintained by news outlets, government agencies, credit bureaus, LexisNexis, the Financial Industry Regulatory Agency ("FINRA"), self-regulatory organizations, hospital databases, state and national board and/or bar associations, company records, Internet databases, Google databases, etc. Thus, for example, when system 100 is applied to a broker/investor interaction, data sources may include data sources maintained by LexisNexis, FINRA, credit bureaus, and other self-regulatory organizations. In contrast, when system 100 is applied to a lawyer/client interaction, data sources may include data sources maintained by state bar associations, government agencies, credit bureaus, and LexisNexis. In yet another example, when system 100 is applied in a medical setting, data sources may include LexisNexis, hospital records, state boards, etc.

Figure 2A:
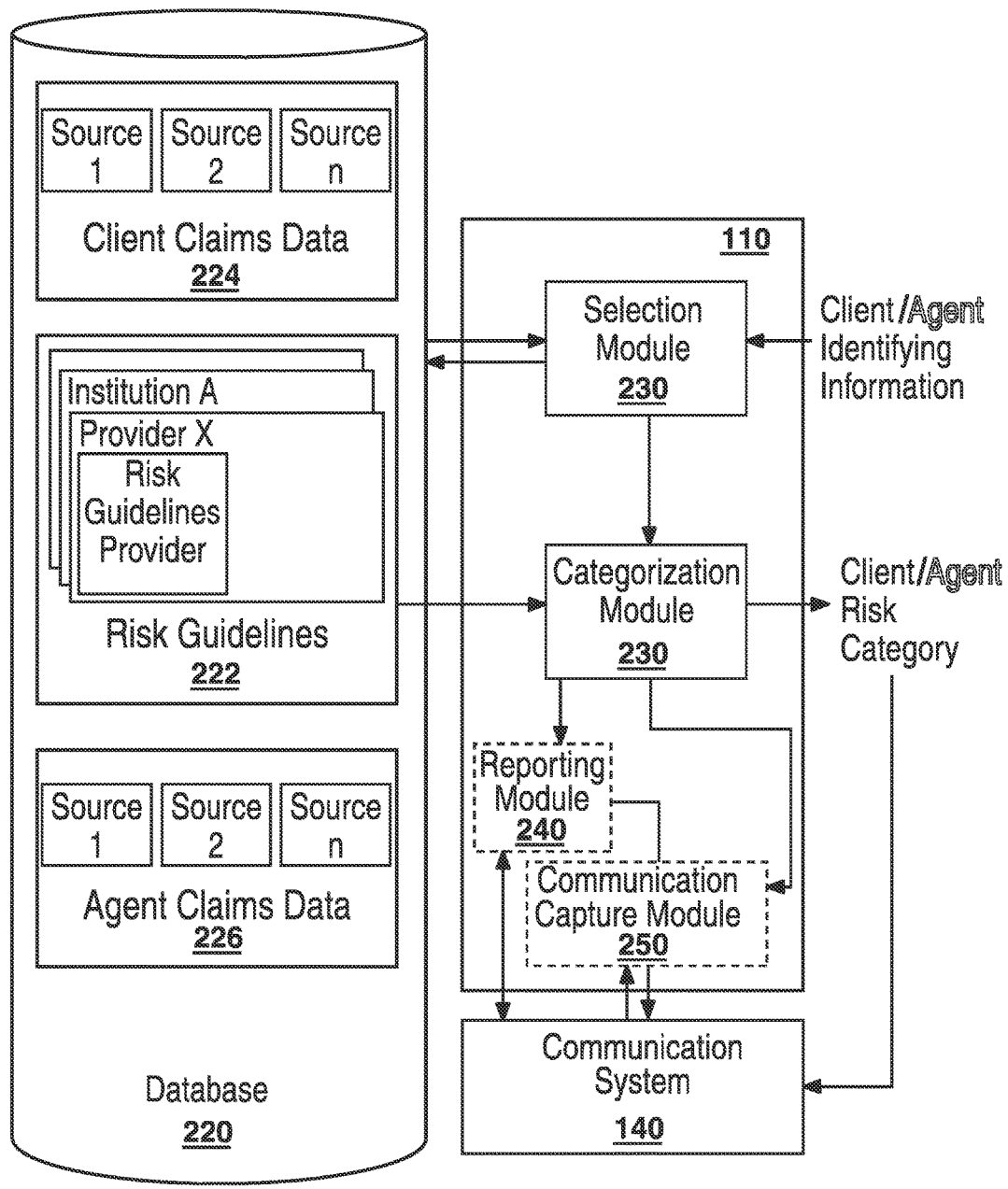
FIG. 2A of the drawings illustrates one potential approach to a computer server 110 for use in association with the system in any of the three potential configurations depicted, 20 among others.
Figure 2B:
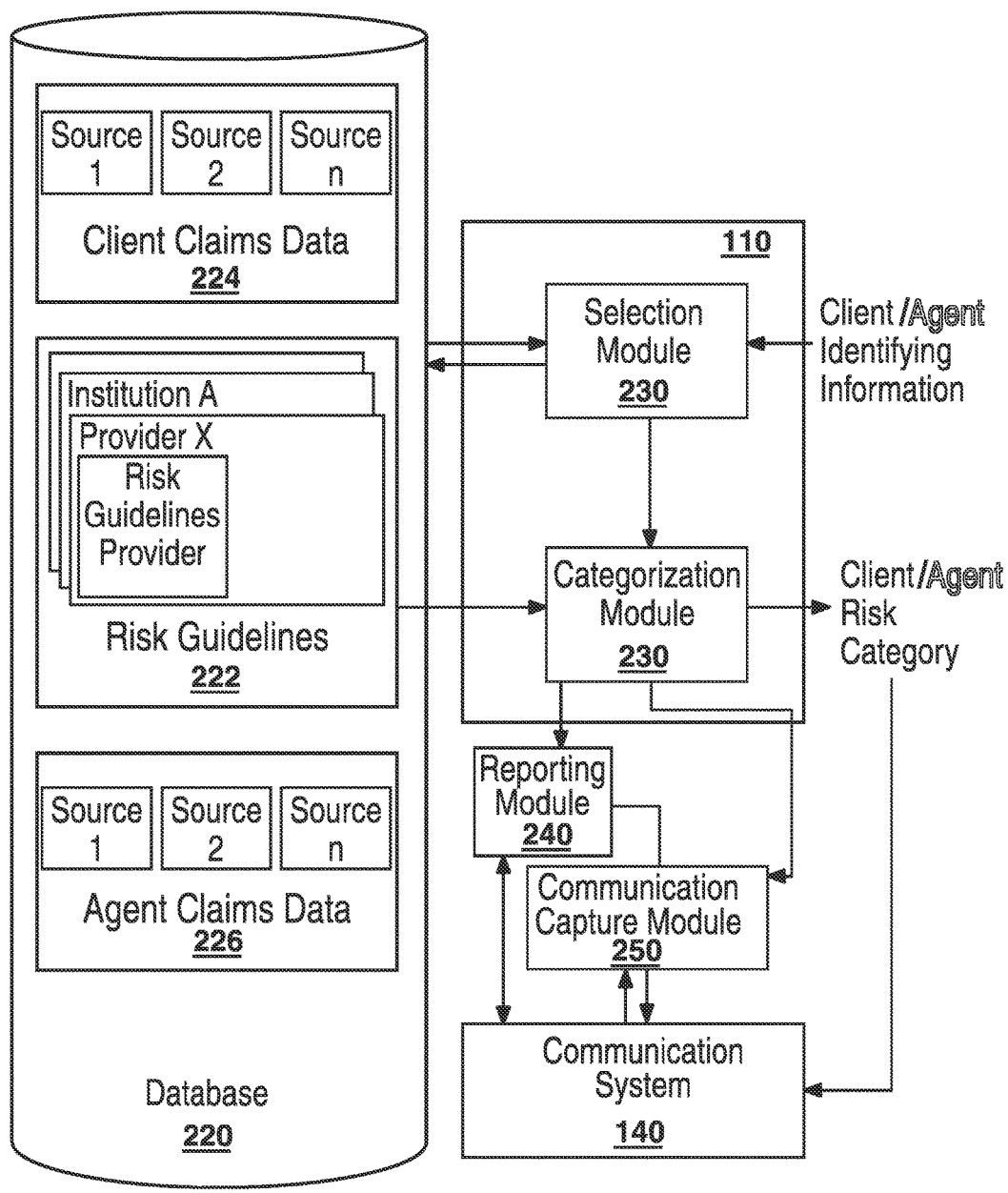
FIG. 2B of the drawings illustrates another potential approach to a computer server 110 for use in association with the system in any of the three potential configurations depicted, among others.

In one example, the client claims data is received by a server associated with a Provider such as servers 110a, 110b, 110c, and 116c. The transmission of client claims data to the recipient servers is in accordance with conventional methods (e.g., by e-mail, over the Internet, by physical conveyance or transfer of physical memory/media, etc.) The client claims data is then stored in a database such as database 115a, 115b, and 115c using conventional methods. With reference to FIGS. 2A and 2B, client claims data 224 from one or more sources (e.g., sources 1-n) may be stored in exemplary database 220 associated with or otherwise operably coupled to computer server 110. As noted above, databases may be relational database that associate client claims data with a particular client.

The method continues in block 330 where risk guidelines are stored. Risk guidelines are associated with Providers, and in one embodiment, are unique to each Provider or agents of a provider. Risk guidelines may include guidelines or one or more logical rules or conditions that allow a computer or other logic to evaluate or assess a potential risk of doing business with or otherwise interacting with a particular client. For example, in a broker/investor interaction, risk guidelines may include rules that interrogate the credit score and litigation history of the investor client to determine whether there is a higher or lower risk of doing business with the investor client as compared to the average investor client with a clean credit score and no history of bringing litigation against any professional service providers. Similarly, risk guidelines may include rules that interrogate the level of sophistication of the investor client such that more sophisticated investors are assigned a lower risk than less sophisticated or experienced investors. The same or similar rules may apply in other settings to which system 100 may be applied. For example, in the medical context, guidelines may be established that assign a higher risk to patients that have filed grievances or lawsuits against treating physicians than to patients that have filed no such grievances or lawsuits.

Risk guidelines may be created and modified by Providers via, for example, workstations 118a, 118b, and 118c. Those of ordinary skill in the art will readily appreciated 20 that risk guidelines may include any set of logic conditions or rules and are not limited to the specific, concrete examples set forth above. With references to FIGS. 2A and 2B, risk guidelines 222 may similarly be stored in database 222. As suggested above, risk guidelines 222 may exist for an institution (e.g., an investment house) or a provider or agent of that provider/institution (e.g., an investor within the investment house).

After storing risk guidelines, the method continues in block 340 where client identifying information is received. Client identifying information may be received on the computer server 110a, 110b, and 110c from the Provider, and in one embodiment, is stored in databases 115a, 115b and 115c, as the case may require. Client identifying information is preferably created by the Provider and/or the end client using for example workstations 118a, 118b, and 118c or other workstations associated with the end client. With reference to FIGS. 4A and 4B, client identifying information may include one or more of the fields illustrated in FIGS. 4A or 4B such as but not limited to name, social security number, date of birth, address, telephone number(s), email address(es), prior addresses, previous provider information (e.g., previous investment firm or house), and/or other information. In the medical context, client identifying information may include health insurance provider name, group number, ID number and/or primary care provider information. In another embodiment, client identifying information may be an anonymous number or other string of letters, numbers, or characters that is associated with the end client and/or the information associated with fields illustrated in FIGS. 4A and 4B. For example, client identifying information may be a six-digit number. Such anonymous numbers or strings of letters, numbers, or characters may be generated using any conventional scheme available to those of ordinary skill in the art.

Next, in block 350, the method may include selecting client claims data based on the client identifying information received from the provider. Client claims data may be selected using, for example, a selection module 230 as illustrated in FIGS. 2A and 2B as part of computer server 110. As used herein, the term "module" may include or refer to any suitable hardware and/or software, or collection of hardware and/or software. A "module" may include circuits, integrated circuits, processors, processing devices, memory (e.g., containing executable instructions to be carried out by any other component), combination logic, processing engines, processors, micro-processors, controllers, micro-controllers, sequencers, micro-sequencers, digital signal processors, hardware accelerators, application specific circuits (ASICs), state machines, programmable logic arrays, etc. Selection module 230 selects client claims data 224 based on or using all or some portion of the received client identifying information.

The method then continues in block 360 where the client associated with the selected client claims data is categorized in a client risk category. The client risk category may follow or be a part of any suitable categorical scheme such as, but not limited to, a scheme of "red," "yellow," and "green" colors to signify the respective degree of risk associated with doing business with or interacting with the selected client. Using the above-identified scheme of traffic-signal colors, a "red" client may be a client associated with a high or significant degree of risk. A "yellow" client may be a client associated with a medium degree of risk. A "green" client may be a client determined to be associated with a low degree of risk. Other schemas may be adopted including a numerical scheme where low risk clients are assigned, for example, a small number such as 1, 2, or 3, medium risks clients are assigned a larger number such as 4, 5, 6, or 7, and high risk clients are assigned an even larger number such as 8, 9, or 10. Those of skill in the art will recognize that there are endless schemes that could be applied to readily associate risk to clients and that the categories of risk need not be as limited as "low", "medium" or "high." In contrast, schemes may incorporate much finer levels or tiers of risk. With reference to FIGS. 2A and 2B, categorization module 230 may be employed to receive the selected client claims data 224 from selection module 230 and to generate such a client risk category.

Upon the determination of client risk category, the method could identify clients who may need additional assistance in conducting transactions with the agent and provider.

Upon the determination of client risk category, the method continues with block 370 where functionality is delivered to the provider that automatically captures communications and automatically reports captured communications to the Provider. There are various options contemplated for delivering this functionality to a provider. For example, Provider A may have this functionality delivered by a third party software as a service (SaaS) company. Hence, server 110a, database 115a and communication system 140a are depicted in FIG. 1 as being on the other side of network 120 from Provider A's workstation 118a. Having the functionality delivered in SaaS fashion allows the Providers to take advantage of the functionality without 10 having to manage that functionality. This approach could be particularly useful for solo providers.

In another exemplary approach to providing functionality that automatically captures communications and automatically reports captured communications to the Provider, the Provider may host their own solution in full. Such a Provider is depicted in FIG. 1 as Provider B. In this case, the software to provide the functionality may be downloaded onto server 110b via the network 120 or from media (such as one or more DVDs, CDROMs, Hard Drives, Flash Drives, etc.) where it will run locally and capture communications locally. The solution associated with Provider C is a hybrid solution where only a portion of the services are provided by a first third party and the rest are either provided by the Provider C or a second third party. It will be understood by those of ordinary skill in the art having the present specification, drawings and claims before them that these illustrative approaches to providing functionality that automatically captures communications and automatically reports captured communications to the Provider are merely exemplary and that other solutions including differing combinations of the foregoing or completely different approaches are contemplated within the scope of the invention.

In one embodiment, the frequency of capturing communications and reporting captured communications to the Provider, or both is based on the client risk category associated with the client. For example, using the traffic-light scheme of risk categories, a red client may have communications captured frequently and/or may have reports based on such communications frequently reported to the Provider. In contrast, a green client may conversely have communications captured infrequently and/or have reports based on such communications infrequently reported to the Provider. The frequency of capturing communications and/or reporting for yellow clients may be in between the frequency of red and green clients.

As noted above and illustrated in FIG. 1, communications may include communications between a client and a provider such as but not limited to communications over a telephone 50, a computer 55 (e.g., via e-mail, instant messenger, etc.), and over smart phone 60 (e.g., over mobile telephone, e-mail, SMS, etc.). In one embodiment, the delivered functionality may be implemented using communication system 140 together with communication capture module 250 and reporting module 240. As illustrated in FIGS. 2A and 2B, communication capture module 250 and reporting module 240 may be co-located within server 110 or located separate from server 110. In one embodiment, communication capture module 250 and reporting module 240 are co-located within communication system 140.

As noted above, communication system 140 is a communication handling system 140 that handles the communications between client and provider. In one embodiment, client risk categories are provided to communication system 140, communication capture module 250 and reporting module 240. Communication system 140 acts to filter out communications that are associated with the particular client associated with the client risk category at a frequency determined by the client risk category and passes the captured communication to the communication capture module 250.

Figure 5:
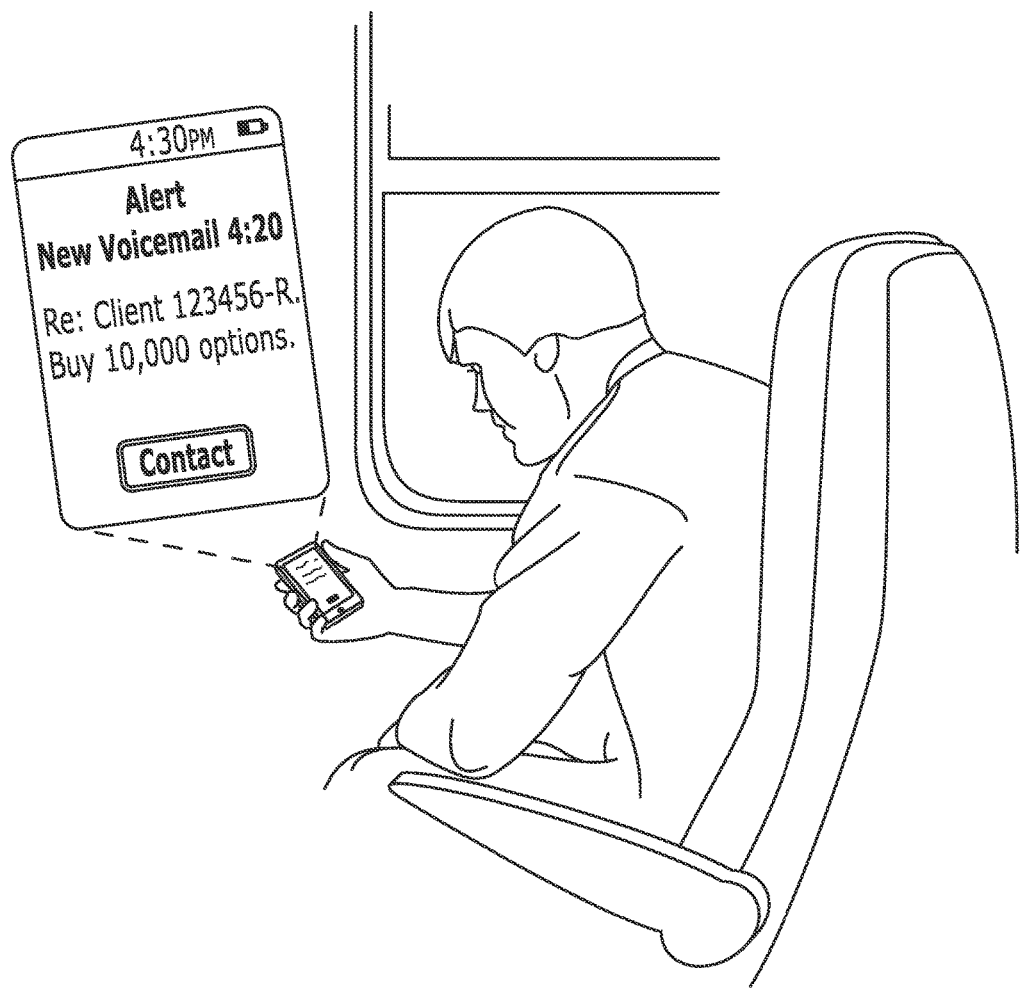
FIGS. 5 and 6 of the drawings illustrate supervisors receiving alert messages from the system regarding a potentially risky transaction between a client and a provider.
Figure 6:

In one embodiment, captured communications are stored (e.g., in database 220 or other suitable memory). In another embodiment, captured communications are forwarded (e.g., in raw form or in a converted from) to the Provider or a supervising employee associated with the Provider for review and consideration. For example, with reference to FIGS. 5 and 6, a captured communication can be sent to the Provider or a supervisor associated with the Provider to alert the Provider of a particular interaction or proposed interaction entered or requested by the client. In the broker/investor setting, for example, a client may request to buy 10,000 option contracts for a particular commodity over a voicemail message. Due to the risk category associated with the client, the communication was captured and sent to the particular broker or a supervising employee associated with the brokerage firm to alert the Provider of this interaction.

In one embodiment, the Provider is alerted to the existence of the captured message as a displayed message on the Provider's smartphone. The display indication of the captured message may alert the Provider of the message, the time of the message, the name or identity of the client, the subject of the message, and in one embodiment, may include the captured message itself. For example, communication system/platform 140 may include a speech-to-text engine that converts a voicemail message or other telephone communication into text. Thus, captured audio may be converted to text such that the substance of a particular oral communication is presented to the Provider as text. In one embodiment, the communication module 250 may present only a subset of the information to the Provider based on the authority of the supervising employee to view this information. For example, it may be determined that the Provider or supervising employee is not authorized to view the client risk category and/or the client name. In such instances, the communication module 250 may present only the subject of the message and an anonymous client identifier to the Provider or supervising employee.

The display on the graphical user interface may further include a "contact" button that permits the Provider to call, text, and/or email the client or another party associated with the Provider regarding the message. For example, if the message is transmitted to a dedicated supervisor of brokers at a brokerage firm, the contact button may be configured to contact the responsible broker interacting with the client.

Figure 8:
FIG. 8 of the drawings illustrates a supervisor reviewing a periodic report generated by the system as part of the method for assessing interaction risks potentially associated with transactions between a client and a provider.

Reporting module 240 may aggregate captured communications associated with a client, and based on the client risk category, produce a report summarizing information or metrics regarding messages between that client and the Provider during a predetermined period of time. For example, report may include a summary of the date and time of each communication between the client and the Provider. Reporting module 240 transmits the report to a predetermined person associated with the Provider based on the client risk category. For example, reporting module 240 may include in the reports transactions associated with red clients more frequently, less frequently for yellow clients and even less frequently for green clients. FIG. 8 illustrates a predetermined person associated with the Provider reviewing such a report.

Returning to FIG. 3B, method block may include block 381, which automatically captures communications at random, in addition to or in lieu of capturing communications for a given client based solely on a client risk category. By capturing communications at random, the system 100 may at least partially obscure the fact that any particular client is red or yellow risk-level client. In this manner the system may avoid contributing to the possibility that some providers could treat high-risk clients differently.

The delivered functionality may also include block 382, which automatically captures communications with certain keywords. In one embodiment, blocks 381 and 382 are implemented using communication capture module 250 and/or communication system 140. Thus, for example, communication capture module 250 and communication system 140 may be programmed to capture not only communications of a particular client at a particular frequency based on the client's risk category, but module 250 and system 140 may also be programmed to interrogate communications for certain keywords unique to a particular client and/or risk category for capture. For example, in the broker/investor setting, a green client may only have communications captured once a calendar quarter based on the determination that this client poses a low risk to the Provider. Notwithstanding the green client risk category, communication capture module 250 and communication system 140 may also capture some or and all communications that include certain keywords such as "Million," "Options," etc. By having the requisite intelligence to search for keywords in addition to capturing messages at a predetermined frequency, system 100 ensures that particularly risky interactions, as determined by the Provider, are recorded, and in some instances may result in notification to a supervisor.

Figure 7:
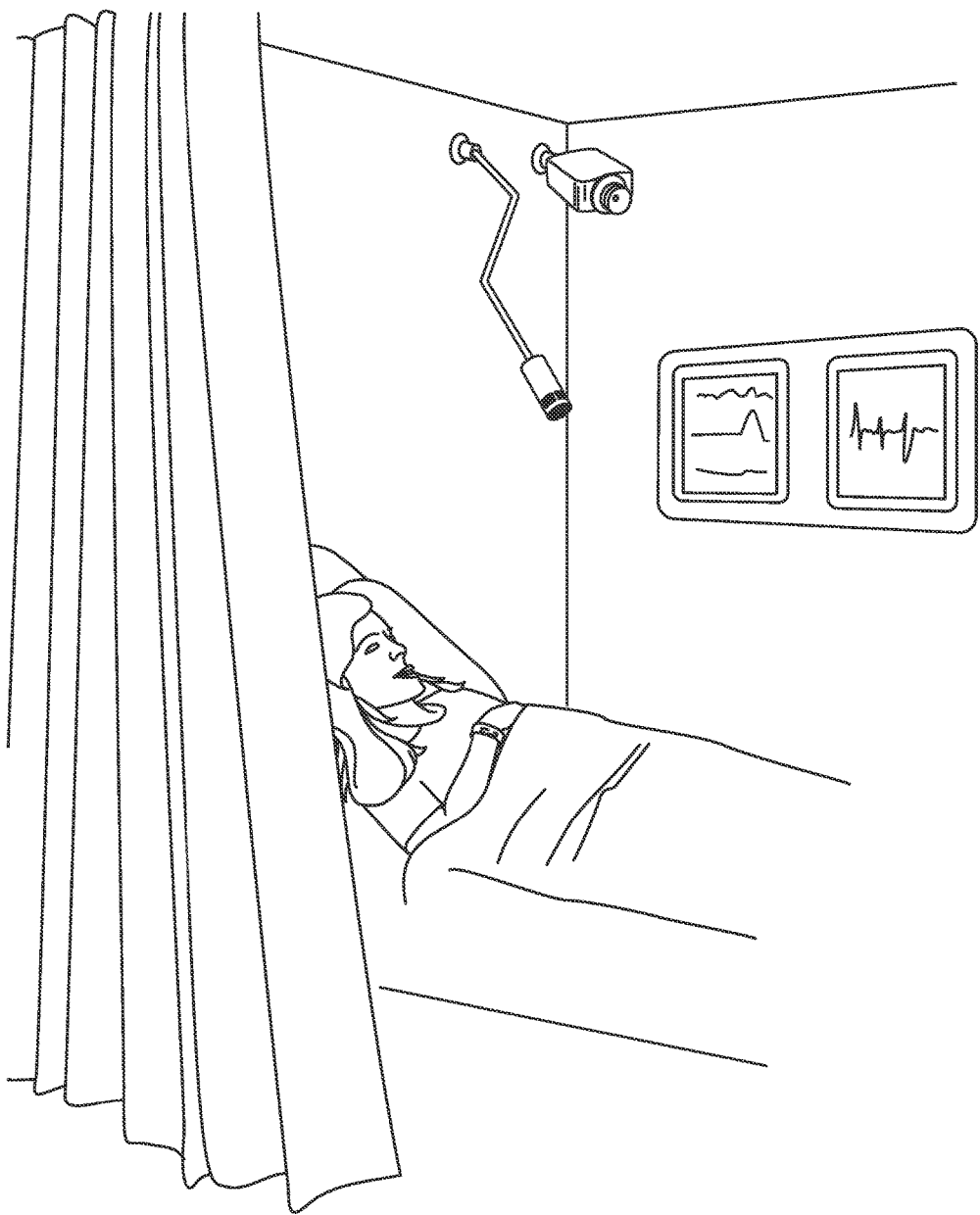
FIG. 7 of the drawings illustrates deployment of one potential embodiment in a medical care setting.

FIG. 7 of the drawings illustrates deployment of one potential embodiment in a medical care setting. In particular, FIG. 7 illustrates a patient recovery room in a hospital or other medical facility where a microphone and/or video recorder are mounted to a wall in the room. In one embodiment, microphone and/or video recorder are positioned to avoid capturing images of the patient's face. Microphone and video recorder may be coupled to communication system 140 such that a patients communications and interactions with medical professionals may be appropriately monitored (e.g., based on the patient's client risk category).

Returning to FIG. 3A, the method may further be implemented in a setting where the Provider is an institution having a plurality of institutional agents and where a risk factor or category is applied to an agent of the provider as well as to the client. For example, the Provider may be a brokerage house having agents as employees. Alternatively, the Provider may be a law firm employing lawyers and paralegals. In yet another embodiment, the Provider may be an accounting agency employing certified public accountants. Alternatively, the Provider may be a medical organization or group employing multiple doctors, nurses, and therapists across multiple hospitals. In such an instance, the method may further include receiving agent claims data as illustrated in block 315 and storing agent claims data in a database 325.

Agent claims data may include for example, any information related to a particular agent of the Provider. For example, agent claims data may include credit and/or financial information such as a credit score or history of bankruptcy, litigation history or propensity, grievance history, educational background, medical history, family medical history, family or other demographic information, or any other information, data or metric related to an agent. Blocks 315 and 325 may be implemented in a manner directly analogous to the method components associated with blocks 310 and 320. For example, agent claims data may be received from one or more data sources such as data sources 130a, 130b, and 130c. A Provider server 110a, 110b, 110c, 116c may receive the agent claims data and store the agent claims data 226 in database 220.

The method may optionally include adding agent risk guidelines into the risk guidelines as illustrated in block 335. As noted above in connection with block 330, risk guidelines may include guidelines or one or more logical rules or conditions that allow a computer or other logic to evaluate or assess a potential risk of doing business with or otherwise interacting with a particular client, or in this instance, a particular agent. For example, in a broker/investor interaction, risk guidelines may not only include rules that interrogate the credit score and litigation history of the investor client, but also interrogate the history of the particular agent. For example, an agent risk guideline may include a rule that junior agents with less than 3 years of experience are assigned a higher risk category than agents with more than 3 years of experience. Alternatively, agent risk guidelines may include an interrogation as to the qualifications of the agent such that an agent that holds Series 7 has a lower risk category than an agent that only holds a Series 63 or Series 66 license.

The method may further include receiving agent identifying information, as set forth in block 345, that identifies an unique agent that is interacting with a particular client. In one embodiment, agent identifying information includes the agent's name, social security number, employee identification number, or any other unique identifying number or data. Next, the method may include storing a predetermined agent risk category, block 375, associated with that agent. In one embodiment, the delivered functionality the capturing, reporting, or both—may be based not only on the client risk category but also the stored, predetermined agent risk category.

Alternatively, the method may include selecting agent claims data based on agent identifying information and categorizing the agent into an agent risk category as described in blocks 355 and 365. The selection of agent claims data and the categorization into an agent risk category may be implemented using selection module 230 and categorization module 230 analogously to the selection of client claims data and client risk category as described above with reference to the risk guidelines 222. Upon the determination of an agent risk category, the delivered functionality—i.e., the capturing, reporting, or both is further based on the agent risk category associated with each communication.

In yet another alternative, the method may include storing an agent risk category as set forth in block 375, selecting agent claims data based on agent identifying information, as set forth in block 355, categorizing agent information into an agent risk category as set forth in block 365, and over writing the agent risk category if the agent risk category determined in block 355 is riskier than the stored agent risk category from block 375. Upon the determination of an agent risk category, the delivered functionality—i.e., the capturing, reporting, or both—is further based on the agent risk category associated with each communication.

Finally, the method may also include updating client claims data and/or agent claims data in block 305 periodically or when otherwise appropriate. For example, updating claims data may be appropriate on a weekly, quarterly, monthly, or annual basis. Alternatively, claims data may be updated whenever requested by a Provider. In yet another embodiment, claims data may be pushed by data sources at intervals determined by the data sources.

Although not depicted in the figures, the present disclosure contemplates normalizing claims data for both clients and agents. The normalization of claims data recognizes that not all data sources are created equal and that claims data may need to be adjusted or weighted to account for the credibility, trustworthiness, or reliability of the data source from which claims data is received. The normalization of claims data may be implemented by, for example, servers 110a, 110b, 110c and/or 116c using appropriate normalization logic that normalizes the claims data after receiving it and before storing it in database 220.

Figure 9:
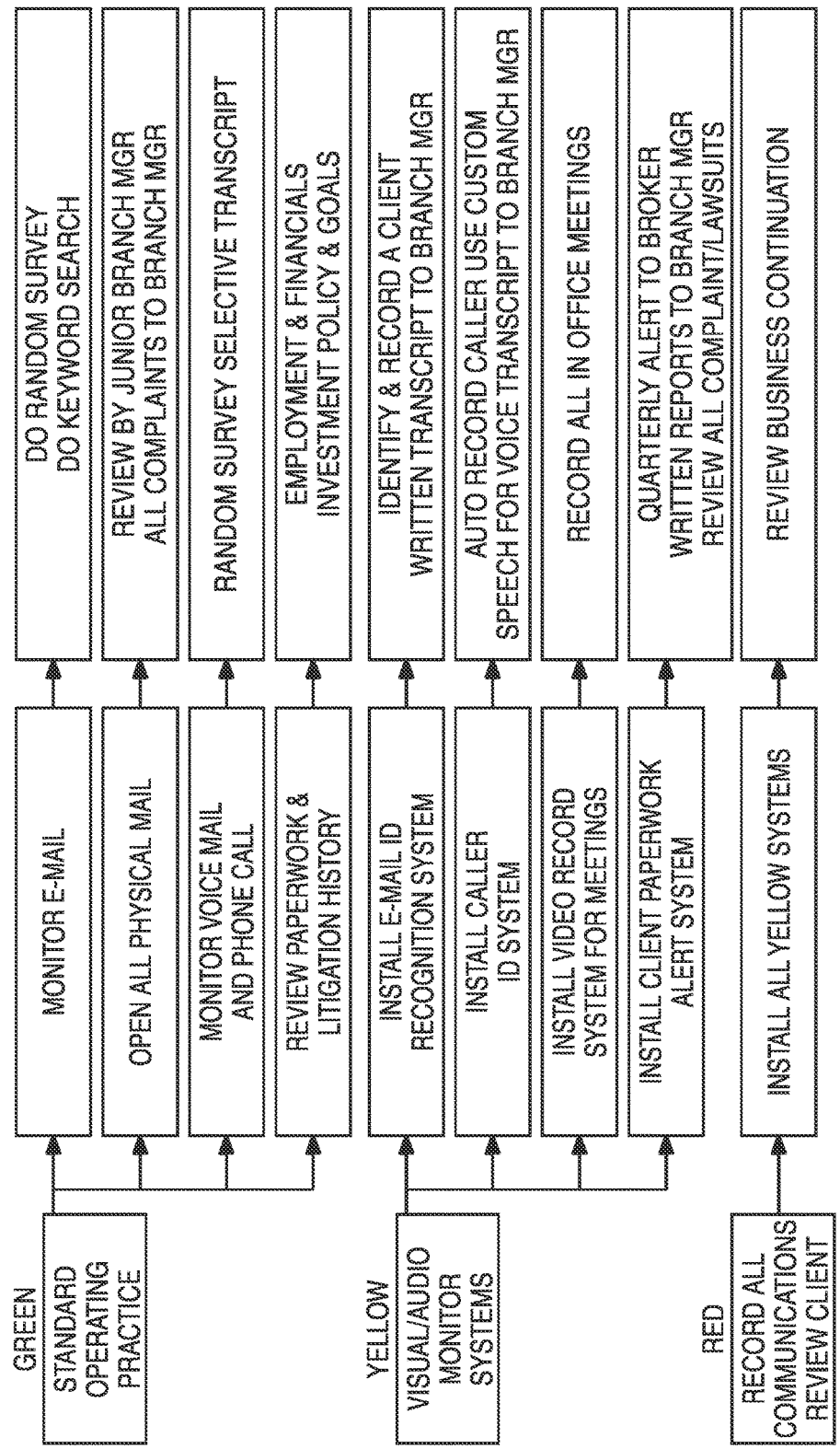
FIG. 9 of the drawings illustrates various potential monitoring that may be achieved by the present invention.

FIG. 9 illustrates an exemplary set of procedures that may be implemented by a provider based on a determined client (and/or agent) risk category. The procedures further indicate several additional advantages that may be realized by implementation of system 100 and the above-describe methods.

In another potential embodiment, the system 100 may additionally store captured communications and the Provider's responses to such communications. For example, a supervising employee may prevent an agent from completing a transaction based on that client and/or agent's risk categories. In one embodiment, the supervising employee may be provided with an interface in which the supervising employee may record the basis for precluding the agent from completing a transaction. In instances where the supervising employee allows the agent to complete the transaction based on the information provided, this information may also be stored in the database. In these instances, the information gathered about the communications and the supervising employee's rationale for allowing the agent to move forward with any transactions may be saved in the respective database. The positive and negative information may all be stored along with the other agent claims data in the database in block 325, 335. In some embodiments, all transactions (rather than just risky transactions) as well as other agent data may be additionally saved to the system. All of this information and feedback data may be used to provide risk information to the Provider based on all of these additional insights.

In another embodiment, the system 100 may include a centralized server 900 that gathers data from the various providers' databases 115*a*, 115*b*, and 115*c* as well as FINRA and other sources. The centralized server 900 may have an associated database 915. The centralized server 900 may run various searches and analyses on the collected data to identify potential current problems with agents, providers, and/or clients. Risk guidelines may be developed across the entire system (as opposed to provider-by-provider) through these searches and analyses. The centralized server 900 may also provide research and reporting functionality that allows users to search for particular patterns or keywords, types of information/trades, and other key data that may be identified as the system continues to review the past and present data. After the collection of data, the system may have sufficient responses to extrapolate from current statuses to identify potential future problem transactions.

The centralized server 900 would use all past and current information and generalized risk guidelines to apply the inventive methodology and screening to create centralized scoring for agents and clients. Reports may be generated by the centralized server 900 and provided to centralized regulators. These reports may flag trends. These reports may forecast potential future problems. The server may use artificial intelligence heuristics to review past history to allow it to react to trends data so as to be able to detect future problems.

The present disclosure provides a solution to the long-felt need described above. In particular, system 100 and the methods described herein may be configured to automatically protects the interests of the service providers and their firms/companies from clients that later refute the existence or scope of communications/messages/instructions out of malice or a legitimate misunderstanding. System 100 and the above-described methods protect service providers from being "burned" by clients in a distracting battle of "he said, she said" and operate behind the scenes so as to not interrupt a service provider's efficiency, output and/or work product. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from foe scope or spirit of the present disclosure, and it is intended that the present disclosure covers all such modifications and variations provided they come within the scope of the following claims and their equivalents.

What is claimed is:

1. A method for actively monitoring interaction risks via a computer server potentially associated with transactions between a client and a provider, wherein the transactions between the client and provider are conducted in association with two or more communication platforms associated with the provider, the two or more communication platforms selected from the group comprising voice handlers, email servers, short message service servers, instant message servers and fax servers, the method comprising:

receiving client claims data on the computer server from a first data source, the client claims data having at least some portion of data related to the client;

storing client claims data in a database operably associated with the computer server, the client claims data stored in the database being inaccessible to the provider;

storing risk guidelines in the database operably associated with the computer server, at least one of the risk guidelines associated with the provider;

receiving client identifying information on the computer server from the provider;

selecting client claims data from the database based on the client identifying information from the provider;

categorizing, by the computer server, the client into a client risk category based on a computer analysis of the risk guidelines associated with the provider and the selected client claims data, the risk category of the client being inaccessible to the provider;

delivering functionality to the provider that automatically, without user intervention, captures communications involving the client and the provider on at least one of the two or more communication platforms and automatically reports on the captured communications via at least one of the two or more communication platforms, a frequency of capturing, reporting, or both being based on the provider-inaccessible client risk category associated with the client; and preventing, by an employee of the provider, an agent of the provider from completing at least one of the transactions between the client and provider based at least in part on the automatic reports of the captured communications.

2. The method of claim 1, further comprising:

storing agent data regarding at least one agent of the provider on the computer server, the agent data received from a variety of data sources;

obtaining feedback data related to at least one of the client, the agent, and a transaction between the client and the provider; and analyzing the agent data, the client claims data, and the feedback data to identify potential future transactional problems.

3. The method of claim 2, wherein the variety of data sources includes a database managed by the Financial Industry Regulatory Agency.

4. The method of claim 2, wherein the step of analyzing the agent data, the client claims data, and the feedback data to identify potential future transactional problems includes drawing data from a risk guideline database.

5. The method of claim 1, wherein the computer server includes a selection module including one or more processors configured to select client claims data based on at least a portion of client identifying information and a categorization module including one or more processors configured to receive the selected client claims data from the selection module and generate the provider-inaccessible client risk category.

6. The method of claim 1, wherein client claims data is received by the computer server from two or more servers associated with two or more providers and risk guidelines are associated with each of the two or more providers, and wherein risk guidelines are unique to each of the two or more providers.

7. The method of claim 1, wherein the database storing the client claims data is a set of virtual storage areas and system operably connected to the computer server.

8. The method of claim 1, wherein the provider is an institution having a plurality of institutional agents, the method further comprising:

storing, for each of the plurality of institutional agents, an agent risk category for each of the plurality of institutional agents in the database, wherein the frequency of the capturing, reporting, or both is further based on the agent risk category associated with each communication.

9. The method of claim 8, further comprising:
receiving agent claims data on the computer server from a second data source, wherein at least some portion of the agent claims data is related to one of the plurality of institutional agents;
storing agent claims data in the database operably associated with the computer server;
selecting agent claims data from the database based on the agent identifying information;
determining an agent risk category based on a computer analysis of the risk guidelines for the provider and the selected agent claims data; and
writing over the stored agent risk category for each of the plurality of institutional agents in the database when the determined agent risk category is riskier than the stored agent risk category.

10. The method of claim 9, wherein the agent claims data is received from a plurality of data sources, further comprising normalizing the agent claims data between the plurality of data sources.

11. The method of claim 9, wherein the delivered functionality further includes functionality for comparing words in the communication with stop words, the frequency of capturing, reporting, or both is further based on presence of keywords in the communication.

12. The method of claim 11, wherein one of the communication platforms is a telephone system and the delivered functionality automatically captures audio from telephone calls on the telephone system, the delivered functionality further includes functionality that automatically converts the captured audio into text.

13. The method of claim 9, wherein the client identifying information includes a telephone number associated with the client, the delivered functionality further includes functionality that identifies the client associated with the telephone call on the telephone system based on the telephone numbers associated with the telephone call.

14. A system for actively monitoring interaction risks potentially associated with transactions between a client and a provider, wherein the transactions between the client and provider are conducted in association with two or more communication platforms associated with the provider, the two or more communication platforms selected from the group comprising voice handlers, email servers, short message service servers, instant message servers and fax servers, the system comprising:
on a computer server, means for receiving client claims data from a first data source, the client claims data having at least some portion of data related to the client, means for receiving client identifying information from the provider, electronic storage for the client claims data, provider risk guidelines, and client identifying information, means for categorizing the client into a provider-inaccessible client risk category based on the provider risk guidelines and the client claims data stored on the computer server; and means for automatically capturing communications involving the client and the provider on at least one of the two or more communication platforms based on the provider-inaccessible risk category of the client;
means for automatically, without user invention, reporting on the captured communications via at least one of the two or more communication platforms, a frequency of capturing, reporting, or both being based on the provider-inaccessible client risk category associated with the client; and
a user interface for preventing, by an employee of the provider, an agent of the provider from completing at least one of the transactions between the client and provider based at least in part on the automatic reports of the captured communications.

15. The system of claim 14, wherein the provider is an institution having a plurality of agent identifying information from the provider wherein the electronic storage further stores the agent identifying information and an agent risk category for each of the plurality of institutional agents, wherein the frequency of the capturing, reporting, or both is further based on the agent risk category associated with each communication.

16. The system of claim 14, further comprising:
means for receiving agent claims data on the computer server from a second data source, wherein at least some portion of the agent claims data is related to one of the plurality of institutional agents, wherein the agents claims data is saved in the electronic storage; and
means for selecting agent claims data from the saved agents claim data based on the agent identifying information; and
means for determining an agent risk category based on the risk guidelines for the provider and the selected agent claims data, wherein the means for determining the agent risk category writes over the stored agent risk category for each of the plurality of institutional agents in the electronic storage when the determined agent risk category is riskier than the stored agent risk category.

17. The system of claim 16, further comprising means for comparing words in the communication with keywords such that the frequency of capturing, reporting, or both is further determined by presence of keywords in the communication.

18. The system of claim 17, wherein one of the communication platforms is a telephone system, the system further comprising:
means for automatically capturing audio from telephone calls on a telephone system;
and means for automatically converting the captures audio into text.

19. The system of claim 18, wherein the client identifying information includes a telephone number associated with the client, the system further comprising means for identifying the client associated with a telephone call on the telephone system based on the telephone numbers associated with the telephone call.

20. A method for actively monitoring interaction risks associated with transactions between a client and one or more providers, wherein the transactions between the client and the one or more providers are conducted in association with two or more communication platforms associated with the one or more providers, the two or more communication platforms selected from the group consisting of voice handlers, email servers, short message service servers, instant message servers and fax servers, the method comprising:
receiving client claims data on a computer server from one or more data sources, the client claims data having at least a portion of data related to the client;
storing client claims data in at least one database operably associated with the computer server;
storing risk guidelines in at least one database operably associated with the computer server, at least one of the risk guidelines associated with the provider;
receiving client identifying information on the computer server from the one or more providers;
selecting client claims data from the database based on the client identifying information from the provider;

categorizing, by the computer server, the client into a provider-inaccessible client risk category based on a computer analysis of the risk guidelines associated with the provider and the selected client claims data;

delivering functionality to the one or more providers that automatically captures communications involving the client and the provider on at least one of the one or more communication platforms, a frequency of capturing being based on the provider-inaccessible client risk category associated with the client;

delivering additional functionality to the one or more providers that automatically captures at least one random communication, in addition to capturing communication based on the risk category;

delivering additional functionality to the one or more providers that automatically reports on the captured communications based on the client risk category and random captured communications via at least one of the two or more communication platforms; and preventing, by an employee of the provider, an agent of the provider from completing at least one of the transactions between the client and provider based at least in part on the automatic reports of the captured communications;

wherein automation of capturing and reporting is without user intervention.

* * * * *